US012812222B2

(12) United States Patent
Channapragada et al.

(10) Patent No.: US 12,812,222 B2
(45) Date of Patent: Nov. 24, 2026

(54) SYSTEMS AND METHODS FOR MANAGING INTERRUPTION OF CONTENT PRESENTATION

(71) Applicant: Adeia Guides Inc., San Jose, CA (US)

(72) Inventors: Srikanth Channapragada, Bangalore (IN); Vikram Makam Gupta, Bangalore (IN)

(73) Assignee: Adeia Guides Inc., San Jose, CA (US)

( * ) Notice: Subject to any disclaimer, the term of this patent is extended or adjusted under 35 U.S.C. 154(b) by 0 days.

(21) Appl. No.: 18/990,472

(22) Filed: Dec. 20, 2024

(65) Prior Publication Data

US 2025/0126333 A1 Apr. 17, 2025

Related U.S. Application Data

(63) Continuation of application No. 18/431,225, filed on Feb. 2, 2024, now Pat. No. 12,219,224, which is a continuation of application No. 17/831,839, filed on Jun. 3, 2022, now Pat. No. 11,924,525, which is a continuation of application No. 17/247,302, filed on Dec. 7, 2020, now Pat. No. 11,381,887.

(51) Int. Cl.
*H04N 21/845* (2011.01)
*H04N 21/45* (2011.01)

(52) U.S. Cl.
CPC ....... *H04N 21/845* (2013.01); *H04N 21/4532* (2013.01)

(58) Field of Classification Search
None
See application file for complete search history.

(56) References Cited

U.S. PATENT DOCUMENTS

| | | | |
|---|---|---|---|
| 1,093,147 A | 4/1914 | Reeves | |
| 9,032,429 B1 * | 5/2015 | Goetz | G06F 16/7844 725/19 |
| 9,948,966 B1 | 4/2018 | Panchaksharaiah et al. | |
| 10,931,471 B2 * | 2/2021 | Ramirez | H04N 21/43615 |
| 11,381,887 B2 | 7/2022 | Channapragada et al. | |
| 11,924,525 B2 * | 3/2024 | Channapragada | H04N 21/84 |
| 12,219,224 B2 * | 2/2025 | Channapragada | H04N 21/44209 |
| 2003/0070182 A1 * | 4/2003 | Pierre | H04N 21/4325 725/135 |
| 2003/0097659 A1 * | 5/2003 | Goldman | H04L 65/613 725/89 |
| 2005/0160308 A1 | 7/2005 | Elcock et al. | |
| 2010/0235681 A1 | 9/2010 | Suetsugu et al. | |
| 2011/0023060 A1 * | 1/2011 | Dmitriev | H04N 21/26258 705/14.66 |

(Continued)

*Primary Examiner* — Alexander Q Huerta
(74) *Attorney, Agent, or Firm* — HG LAW LLP

(57) ABSTRACT

Methods and systems for managing an interruption of content presentation on a computing device are provided. In one example, an interruption of presentation of a segment of content on a computing device is detected. An estimated recovery time is determined for the interruption. Based at least in part on the estimated recovery time, a determination is made as to whether to skip the segment or wait to resume presentation of the video segment after the interruption subsides. Based on a result of the determining whether to skip or wait, an instruction to wait or an instruction to skip the segment is generated for presentation via the computing device.

18 Claims, 8 Drawing Sheets

(56) References Cited

U.S. PATENT DOCUMENTS

| | | | | |
|---|---|---|---|---|
| 2011/0289526 | A1* | 11/2011 | Poole | H04N 21/8455 725/14 |
| 2012/0072611 | A1 | 3/2012 | Kandekar et al. | |
| 2012/0099514 | A1 | 4/2012 | Bianchetti et al. | |
| 2013/0101274 | A1 | 4/2013 | Nguyen | |
| 2013/0305290 | A1* | 11/2013 | Craner | H04N 21/4668 725/46 |
| 2014/0245362 | A1 | 8/2014 | Holley | |
| 2015/0201237 | A1* | 7/2015 | Seiden | H04N 21/44218 725/12 |
| 2016/0261892 | A1 | 9/2016 | Mathur et al. | |
| 2017/0223361 | A1 | 8/2017 | Blomqvist | |
| 2017/0286528 | A1 | 10/2017 | Peterson | |
| 2017/0332125 | A1* | 11/2017 | Panchaksharaiah | H04N 21/8549 |
| 2018/0301167 | A1* | 10/2018 | Losey | H04N 21/44226 |
| 2018/0310045 | A1* | 10/2018 | Panchaksharaiah | H04N 21/26258 |
| 2021/0385522 | A1 | 12/2021 | Giladi | |
| 2022/0174347 | A1* | 6/2022 | Gupta | H04N 21/231 |
| 2023/0126665 | A1 | 4/2023 | Channapragada et al. | |
| 2024/0171830 | A1 | 5/2024 | Channapragada et al. | |

* cited by examiner

400

INTERRUPTION TABLE

| | **Server device** | **User device** | **Communication network** |
|---|---|---|---|
| CPU X | 0.9s | 3s | 0.1s |
| CPU Y | 0.4s | 2s | 0.1s |
| WiFi card X | n/a | 10s | n/a |
| WiFi router X | n/a | n/a | 10s |
| Bandwidth X | 5s | 30s | 20s |
| Memory X | 1s | 15s | 5s |
| ... | ... | ... | ... |

FIG. 4

SYSTEMS AND METHODS FOR MANAGING INTERRUPTION OF CONTENT PRESENTATION

CROSS REFERENCE TO RELATED APPLICATIONS

This application is a continuation of U.S. patent application Ser. No. 18/431,225, filed Feb. 2, 2024, which is a continuation of U.S. patent application Ser. No. 17/831,839, filed Jun. 3, 2022, now U.S. Pat. No. 11,924,525, which is a continuation of U.S. patent application Ser. No. 17/247,302, filed Dec. 7, 2020, now U.S. Pat. No. 11,381,887, the disclosures of which are hereby incorporated by reference herein in their entireties.

BACKGROUND

The present disclosure relates to interruption manager systems and methods to manage an interruption of media content (video and/or audio) being displayed on an electronic user device such as a smartphone, tablet, smart TV, laptop, computer, phablet, e-reader, etc.

SUMMARY

An interruption during play of a media asset may occur for different reasons. However, they usually have the same effect on the user, such as frustration and loss of interest. It is against this background that embodiments of the present invention have arisen. There is a need for improved interruption manager systems and methods, which may handle in an efficient way those interruptions and, in particular, may alleviate the effect of the interruption without seeking a technical solution to the interruption itself. A side effect of interruption, besides the frustration and loss of interest, may be the perturbation of a user time schedule associated with the consumption of the media asset. For example, a 13-min long video, played during a 14-min train commute, may end up overshooting the allocated time period if the video gets interrupted for long or too often. Also, an interruption during play of a movie does not generate the same amount of frustration if the interruption occurs during the intro or a crucial scene of the movie.

In some approaches described herein, an interruption manager system is provided to improve the user experience, by skipping or not some segments of a media asset that is played and gets interrupted. The interruption manager system detects that a video segment of a media asset that is being played by a computing device is interrupted. Typically, the interruption involves a media player that starts buffering the media asset. The interruption may be due to the computing device itself or to any device involved in a communication between a remote server device and the computing device. In relation to the interruption, the interruption manager system determines an estimated recovery time. The estimated recovery time is an estimation of a duration that is needed for the interrupted segment to resume. For example, the interruption manager system may identify a type of the interruption and, by cross-referencing an interruption table, may obtain an estimated recovery time in function of the type of the interruption. Typically, an estimated recovery time is between 0.1 s and 30 s. The interruption manager system then determines, based at least in part on the estimated recovery time, an action to perform, the action involving waiting or not intervening, or skipping the interrupted segment and to play a subsequent segment of the media asset (e.g., the next segment, or a segment that 1 s, 5 s or 10 s later in the media asset). The action may be determined based on a comparison of the estimated recovery time to a threshold (below leads to waiting and above leads to skipping). Waiting may also involve waiting until the interrupted segment is no longer interrupted and presentation of the video segment resumes, or as long as an elapsed time since the detection of the interruption is less than the estimated recovery time. The interruption manager system then generates for presentation, based on the result of the determining whether to skip or wait, an instruction to perform the action, that is to say an instruction to wait or an instruction to skip the segment. By skipping the segment instead of systematically waiting, the user experience may be improved, and the risk of having a media asset overshooting the expected allocated time is reduced.

In an approach, the action to perform is in addition based on an attribute of the segment. The attribute may be a label given to a segment that characterizes its importance, in particular for a user profile (and thus the user of the user profile). For example, intro and credits are usually not important in a movie; a car chase may be important for a user profile associated with many TV shows about cars but not important for a user profile associated with drama and art. The interruption manager system may thus determine an attribute of the segment, and the action to perform is further based at least on an action table that determines, for a given attribute and a given estimated recovery time, an action to perform. At least two attributes are needed (which may be an attribute and a lack of an attribute), but having more attributes (such as three or more) enables the interruption manager system to be more refined and better able to handle the interruption. Similarly, at least one threshold is needed for the estimated recovery (as it defines two areas), but a plurality of thresholds may be used, for the same reasons as explained in relation to the attributes. For instance, there might be an attribute for which waiting is always selected. The attribute may be labelled to a segment based on metadata of the media asset (e.g., type of the scene, dialogue, presence of an actor, etc.) and, in some implementations, based on the user profile as well. By using attributes, the system personalizes its actions, thus further improving the user's experience.

In an approach, the interruption manager system may update the interruption table and/or the action table and/or the user profile based on a different parameters: an actual time of recovery, an action of the user after a segment was skipped (e.g., rewinding).

Depending on the approaches, the interruption manager system may be part of the computing device or a remote server device (e.g., of the media asset provider or an independent server) or be spread over both.

Interruption manager mechanisms, techniques and systems are presently introduced to improve the experience of viewing a media asset during an interruption.

BRIEF DESCRIPTION OF THE DRAWINGS

The above and other objects and advantages of the disclosure will be apparent upon consideration of the following detailed description, taken in conjunction with the accompanying drawings, in which like reference characters refer to like parts throughout, and in which:

FIG. 4 is an illustrative diagram of an action table, in accordance with some embodiments of the disclosure;

DETAILED DESCRIPTION

Methods and systems are disclosed herein to manage an interruption during play of a media asset on an output device of a computing device, such as a user device. The media asset may be a video asset (movie, series, etc.) that is either stored locally on the user device or streamed from a server device via a communication network. The user device may be a smartphone, a tablet, a laptop, a phablet, a computer with a display, a television, a Smart TV, a set-top box, a video game console, etc. The output device may be a screen that is part of the user device or connected to the user device. While being played on the output device by the user device, play of the media asset may be subject to interruption and the media asset may freeze. There may be various reasons for the interruption.

Figure 1:
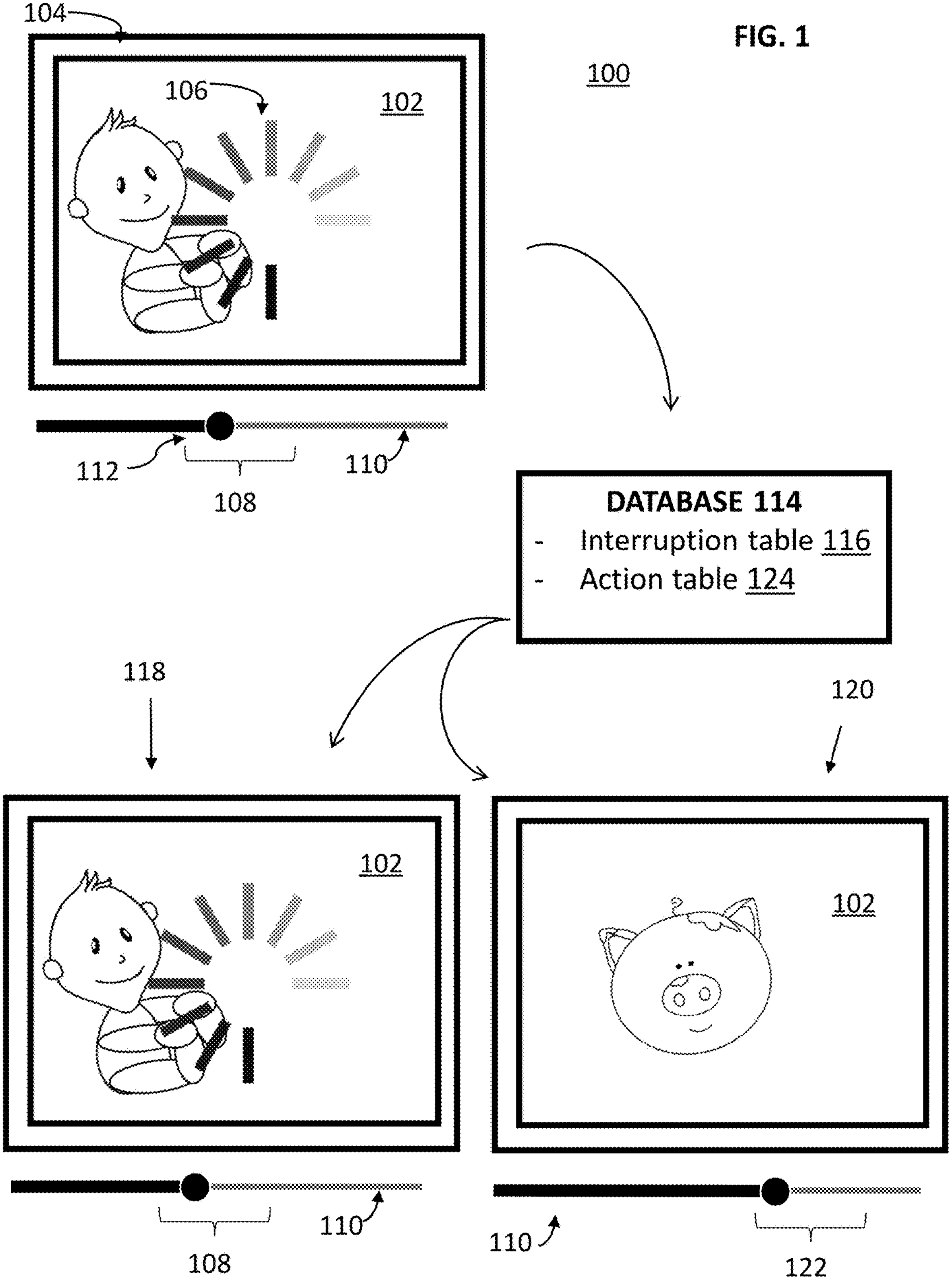
FIG. 1 is an illustrative representation of a situation where a media asset is interrupted and the interruption manager system steps in, in accordance with some embodiments of the disclosure.

FIG. 1 shows a situation 100 of a media asset 102 that is being played on an output device 104 connected to a user device (not represented in FIG. 1), in accordance with some embodiments of the present disclosure. The interruption manager system may be part of the user device that plays the media asset, part of a remote server device, such as a media asset server device that sends the media asset to the user device, or spread across both.

The interruption manager system detects an undesired interruption 106 of the play of the media asset 102. More specifically, the media asset 102 may be split into segments, for instance for technical reasons (the segments may also be called chunks), such as decoding or streaming, and the interruption manager system may detect an undesired interruption of the play of a segment 108 of the media asset (illustrated on a seekbar 110 with a playback position 112). An undesired interruption is an interruption that is not caused by a user input (e.g., a user pausing the media asset). It therefore encompasses any interruption related to an internal function of any component of the user device (such as CPU/GPU limitations) or, if applicable, to a communication between the remote server device and the user device (due to the service device itself or the communication network).

Following the identified interruption, the interruption manager system may determine an estimated recovery time related to the undesired interruption to resume play of the video segment of the media asset that was interrupted. The estimated recovery time, by definition, is determined before play is resumed and can only be estimated. The estimation may be erroneous or inaccurate, but this does not affect how the interruption manager system works. In an implementation, the interruption manager system identifies a type of the interruption and retrieves in a database 114 the estimated recovery time from an interruption table 116. The table 116 may associate different types of interruptions with respective estimated recovery times. For instance, a wireless internet signal loss may have an estimated recovery time of 5 s in the table (e.g., hotspot connection on a train). The table 116 will be described in detail below.

Using the estimated recovery time, the interruption manager system may determine whether to wait or to skip the segment, and, in response, may generate an instruction to wait (illustrated with reference 118) or an instruction to skip the segment 108 that was interrupted (illustrated with reference 120). In an implementation, the instruction to wait is to wait to resume presentation of the video segment after the interruption subsides or ends. In an implementation, the instruction to wait includes generating no instructions: for instance, if the estimated recovery time is below a threshold, then the interruption manager system may determine that the recovery time is low enough to wait and therefore it is sufficient for the user device, or the server device, to wait until play is resumed, at the playback position of the interruption (i.e., segment 108). There is thus no specific need to generate instructions based on the comparison of the estimated recovery time to the threshold. Waiting may be carried out as long as an elapsed time since the interruption is not greater than the estimated recovery time, in order to allow the interruption manager system to adapt to the new situation. In an implementation, the instruction to skip the segment also includes an instruction to play a subsequent segment 122 of the media asset. The subsequent segment may start, for example, between one and two min after the end of the skipped segment. The subsequent segment need not be adjacent to the skipped segment.

In an implementation, determining whether to wait or skip and generating an instruction to wait or an instruction to skip may be further based on an attribute of the segment (e.g., a first attribute, a second attribute, etc.). Each segment may have an attribute that is taken into consideration in an action table 124, the action table 124 defining an action to perform based on the attribute and the estimated recovery time. The action table 124 may be stored in the database 114 as well. The interruption manager system may determine an attribute of the segment, and, using the action table 124, may choose an action based on the estimated recovery time and the attribute of the segment. Metadata associated with the segments, for instance in combination with a user profile, may be used to label the segment with an attribute (e.g., a first attribute, a second attribute). In particular, the attribute may correspond to an importance of the segment for the user: a first attribute means that the segment is of low interest to the user, a second attribute means that the segment is of a medium interest to the user, a third attribute means that the segment is of a high interest to the user. Further details about the attributes will be given below.

Figure 2:
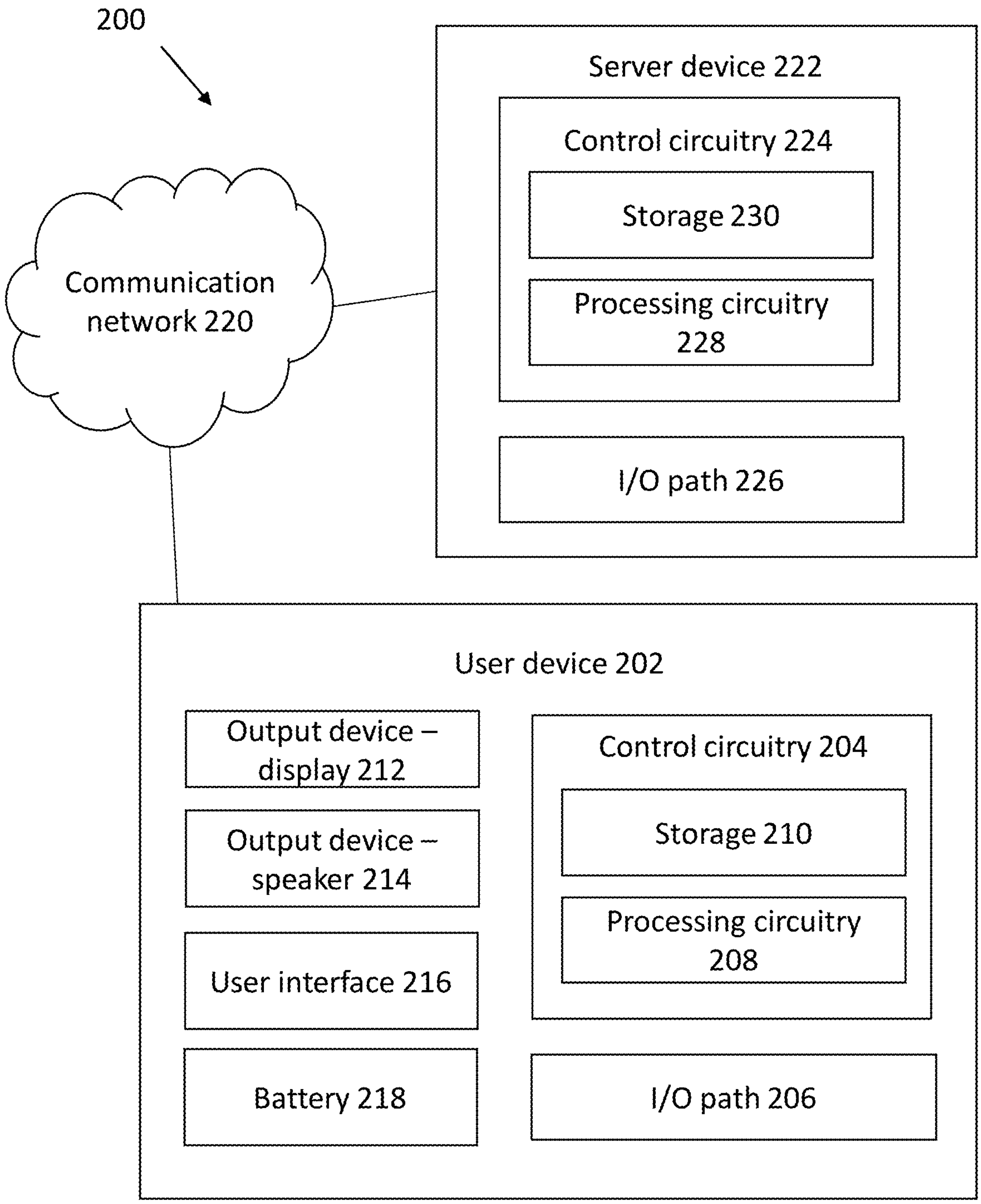
FIG. 2 is an illustrative topology of equipment (or computing configuration) programmed and configured for saving resources, in accordance with some embodiments of the disclosure.

FIG. 2 shows an illustrative block diagram of a computing configuration 200 that may include the interruption manager system presently described. Computing configuration 200 includes a user device 202. In some embodiments, the user device 202 may include control circuitry 204 and an input/output (I/O) path 206. Control circuitry 204 may include processing circuitry 208, and storage 210 (e.g., RAM, ROM, hard disk, removable disk, etc.). I/O path 206 may provide device information, or other data, over a local area network (LAN) or wide area network (WAN), and/or other content and data to control circuitry 204. Control circuitry 204 may be used to send and receive commands, requests, signals (digital and analog), and other suitable data using I/O path 206. I/O path 206 may connect control circuitry 204 (and specifically processing circuitry 208) to one or more communication paths.

User device 202 may include at least one output device, such as a display 212 (e.g., a screen) and/or a speaker 214, to output content visually and audibly. In addition, to interact with a user, user device 202 may include a user interface 216. The user interface 216 may include, for example, a touchscreen, mouse and/or keyboard. The user interface 216 is connected to the I/O path 206 and the control circuitry 204. In an embodiment, the user interface 216 may be a touchscreen enabling the user to provide input(s) to the user device. The display 212 may be a screen (such as a monitor or a TV). The user device 202 may be a smartphone, a tablet, an e-reader, a laptop, a smart TV, a phablet, etc. Alternatively, the output device and the user interface may be connected to the user device. In this case, the user device may be a set-top box, a computer tower, etc.

In an embodiment, the user device 202 comprises a battery 218, which is configured to provide energy (or power) to all the components of the user device 202 that require energy, such as the control circuitry 204 and the output device 212, 214.

Control circuitry 204 may be based on any suitable processing circuitry such as processing circuitry 208. As referred to herein, processing circuitry should be understood to mean circuitry based on one or more microprocessors, microcontrollers, digital signal processors, programmable logic devices, field-programmable gate arrays (FPGAs), application-specific integrated circuits (ASICs), etc., and may include a multi-core processor (e.g., dual-core, quad-core, hexa-core, or any suitable number of cores) or supercomputer. In some embodiments, processing circuitry may be distributed across multiple separate processors or processing units, for example, multiple of the same type of processing units (e.g., two Intel Core i7 processors) or multiple different processors (e.g., an Intel Core i5 processor and an Intel Core i7 processor).

Memory may be an electronic storage device provided as storage 210, which is part of control circuitry 204. Storage 210 may store instructions that, when executed by processing circuitry 208, perform the processes described herein. As referred to herein, the phrase “electronic storage device” or “storage device” should be understood to mean any device for storing electronic data, computer software, or firmware, such as random-access memory, read-only memory, hard drives, solid state devices, quantum storage devices, or any other suitable fixed or removable storage devices, and/or any combination of the same. Nonvolatile memory may also be used (e.g., to launch a boot-up routine and other instructions). Storage 310 may be configured to store the media asset or at least to act as a buffer when the media asset is being streamed.

Computing configuration 200 may also include a communication network 220 and a server device 222. The user device 202 may be coupled to the communication network 220 to communicate with the server device 222. The communication network 220 may be one or more networks including the Internet, a mobile phone network, mobile voice or data network (e.g., a 5G, 4G or LTE network), mesh network, peer-to-peer network, cable network, or other types of communication network or combinations of communication networks. The communication network 106 of FIG. 1 may the communication network 20.

In some embodiments, server device 222 may include control circuitry 224 and an input/output (I/O) path 226. Control circuitry 224 may include processing circuitry 228, and storage 230, which may similar to those already discussed in relation to the user device 202. Server device 222 may be a media asset provider for the user device 202, such as a streaming, VOD, or replay platform, etc. Storage 230 may store a database and any of the tables mentioned in the description. Several databases may be used and several servers may be used as well.

The interruption manager system may comprise the user device 202 or the server device 222, in a client/server approach. Alternatively, the interruption manager system may be distributed over the user device 202 and the server device 222.

Figure 3:
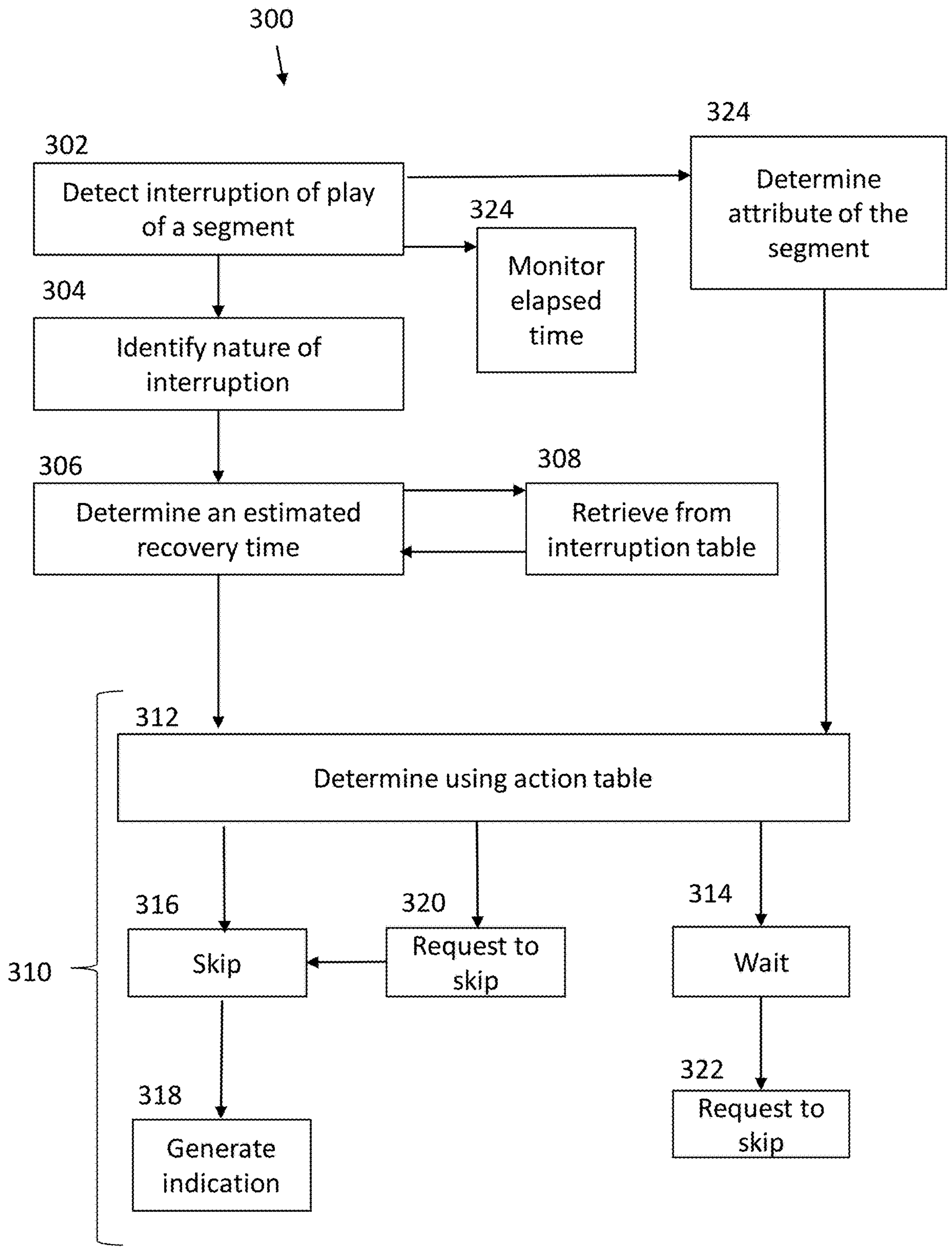
FIG. 3 is an illustrative flowchart of a process for saving resources, in accordance with some embodiments of the disclosure.

FIG. 3 is an illustrative flowchart of a process 300 for managing an interruption of the play of a media asset, in accordance with some embodiments of the disclosure. In some implementations, the process is performed by the server device; in some implementations, the process is performed by the user device; and in some implementations, the process is shared between the user device and the server device. Unless specified otherwise, process 300, and any of the following processes, may be executed by any of control circuitry 204 or 224 or any combination thereof, using the communication network 220.

At step 302, control circuitry detects an undesired interruption of the play of a video segment of a media asset on the output device. Alternatively, the interruption may also be desired. The media asset is made of segments, which, placed end-to-end, reproduce the media asset. Segment may be any subdivisions of the media asset, but they are preferably the segments processed to output the media asset (also called chunks), such as the segments of the streaming service or the segment of the CODEC. The interruption may be, for instance, a media player that stops playing the segment to buffer it. The need to buffer or any other interruption may come from a CPU or a GPU of the user device that is not able to decode the file storing the media asset fast enough (for various reasons) or may come from a communication between the server device and the user device. For instance, the server device may have internal issues, or the communication network may fail (loss of WiFi signal, routers down on a pathway, etc.). At step 304, control circuitry may identify a type of the interruption, as illustrated before, in order to access an interruption table, which lists some types of interruption that may occur (e.g., the most common types). The interruption table may be a database stored in the storage of the user device and/or the server device.

At step 306, control circuitry obtains an estimated recovery time related to the interruption. The estimated recovery time is an estimation of the time between the time at which the media asset was interrupted and a time at which play of the media asset would be normally resumed, at the same playback position. As indicated above, the estimated recovery time is a datum obtained before play is actually resumed and cannot therefore be the actual recovery time (if ever it can be or is eventually known). The estimated recovery time may be retrieved, at step 308, from the interruption table using the identified type of the interruption, as the interruption table includes estimated recovery times for different types of interruption.

FIG. 4 illustrates an embodiment of an interruption table 400 or a portion thereof. The interruption table 400 may list different hardware items (CPU models, WiFi card models, etc.), different properties (bandwidth, memories, etc.), that may be related to the type of the interruption. The interruption table 400 may also list different devices that may be related to the type of interruption (user device, server device, communication network). For each type (for instance, CPU X of the user device), the interruption table provides an estimated recovery time (for instance, for CPU X of the user device, the estimated recovery time is 3 s). This way, based on the identified types of interruption, control circuitry may readily obtain an estimated recovery time.

At step 310, control circuitry generates an instruction to perform an action, based at least on the estimated recovery time. The action is either to wait or to skip the segment. At step 312, control circuitry may determine whether to skip the segment or wait by using an action table, which classifies the actions as a function of the estimated recovery time. For instance, the action table defines one threshold. In response to determining that the estimated recovery time is below the threshold, the action, at step 314, is to wait; in response to determining that the estimated recovery time is above the threshold, the action, at step 316, is to skip the segment. To that end, control circuitry generates for presentation instructions to wait or skip. Waiting may involve not taking any action and merely waiting for the user device to resume play of the segment. Alternatively, if the user device has some software that may interfere with the media player when an interruption is detected, then waiting may involve deactivating the software. Skipping may include skipping the segment only (which may be a few seconds long or longer) or skipping several segments.

In an implementation, the instruction to wait is to wait until an elapsed time from the interruption is more than the estimated recovery time. As explained above, the estimated recovery time may be inaccurate, or the interruption may be longer than originally expected: in that case, the actual recovery time may be (or will be) much longer than acceptable, and waiting is not a viable option. To avoid that situation, control circuitry reassesses the situation once the elapsed time since the interruption reaches the estimated recovery time. For instance, steps 302 to 306 may be carried out again if the situation has changed.

In an implementation, when the action is to skip the segment, control circuitry may, at step 318, generate for display on the output device of the user device a piece of information related to the fact that the interrupted segment was skipped. The information may be accompanied by an option to refuse the skipping of the segment and to request that the play position come back to the interrupted play position.

In an implementation, before generating an instruction to skip, control circuitry may generate for display, at step 320, a request to skip, and may receive, following the request, a reply to the request to skip. Skipping may be performed in response to receiving the reply to the request to skip. In a similar manner, while waiting, after step 314, control circuitry may, at step 322, generate for display a request to skip, in case the user does not want to wait.

In an implementation, after detecting an interruption at step 302, control circuitry may monitor, at step 324, an elapsed time since the detection of the interruption. When the action is to wait, in response to determining that the elapsed time is above the estimated recovery time, control circuitry may skip the segment, or may perform step 310 with an updated estimated recovery time.

In an implementation, not only is the interrupted segment skipped, but play may be shifted to a segment that would correspond to the play position if no interruption had occurred. This enables the media asset to end at the originally expected time.

In an implementation, the action to perform is based on an attribute of the segment. The attribute of a segment is a label given to the segment, the label characterizing an importance of the segment. In an implementation, two or three labels are used (e.g., first, second and third labels); in another implementation, more than three labels are used. For example, the attribute may be a score such that the attributes define an almost continuous scale. In an implementation, the attributes are inclusive: a segment that is labelled with the third attribute is implicitly or explicitly labelled with the first and second attributes as well. At step 324, control circuity may thus determine an attribute of the segment that is interrupted. Step 324 may be carried out in parallel with step 302 of detecting the interruption and not in response to step 302. The action table used in step 312, to determine an action based on the estimated recovery time, further includes information about the attribute, such that the action to perform is based on the estimated recovery time and the attribute of the segment.

Figure 5:
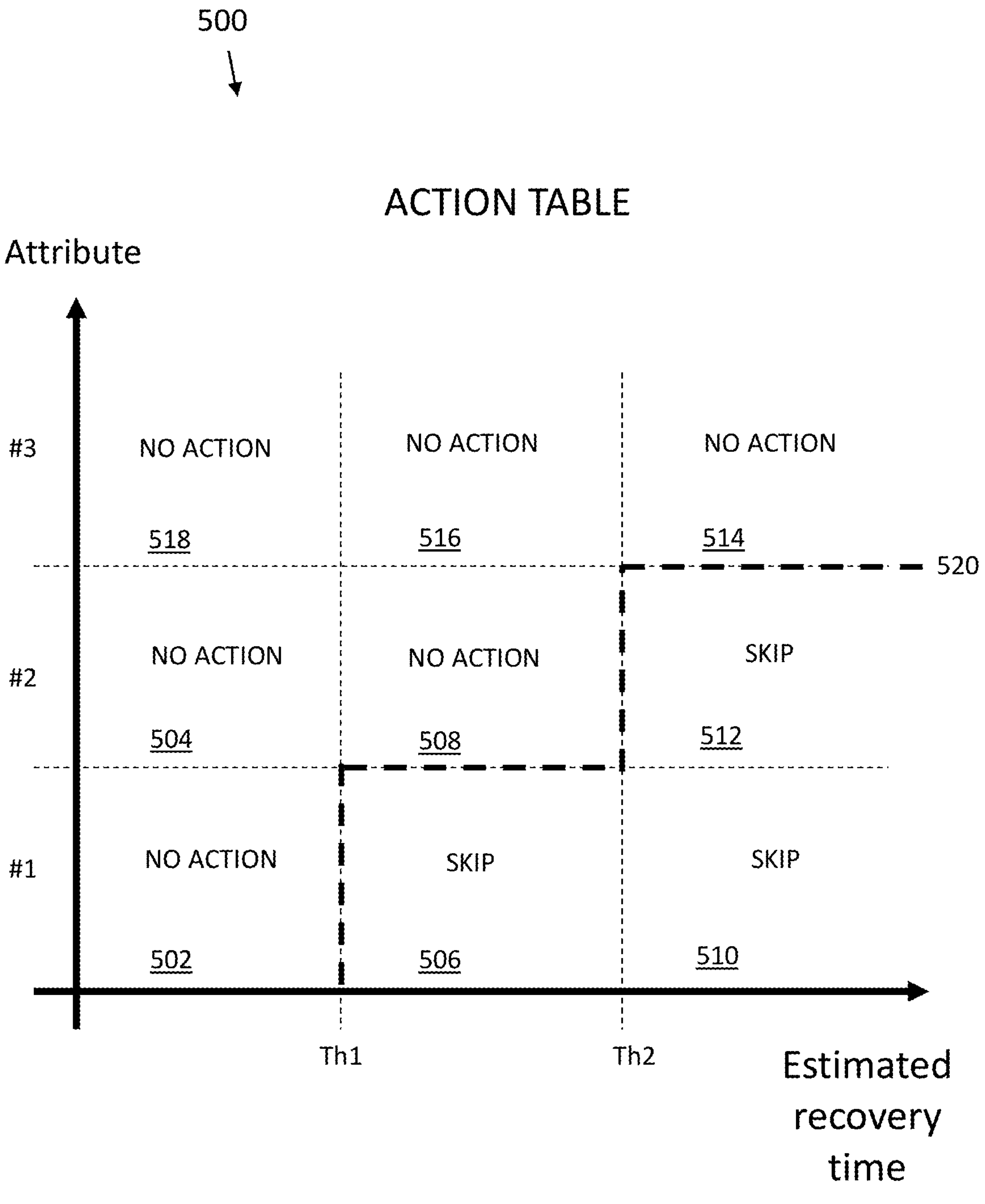
FIG. 5 is another illustrative diagram of an action table, in accordance with some embodiments of the disclosure.
Figure 6:
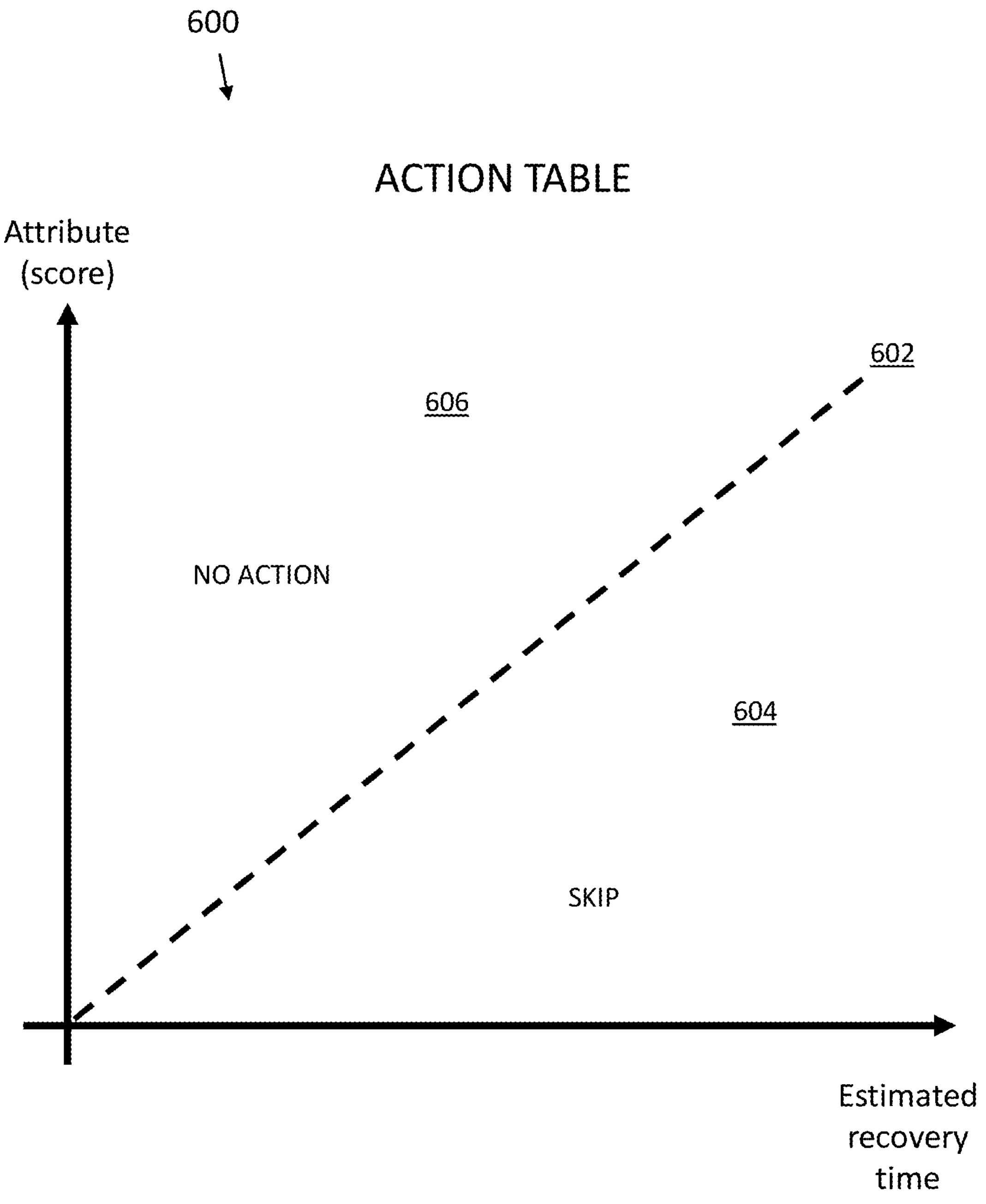
FIG. 6 is another illustrative diagram of an action table, in accordance with some embodiments of the disclosure.

FIGS. 5 and 6 illustrate two implementations of an action table, the former in a discrete form and the latter is a continuous form. Action table 500 of FIG. 5 illustrates a table plotting the action in function of two thresholds (first threshold Th1 and second threshold Th2 for the estimated recovery time) and three attributes (first attribute #1, second attribute #2 and third attribute #3). For example, the first attribute relates to a segment of low interest for a user profile, the second attribute relates to a segment of medium interest and the third attribute relates to a segment of high interest. The two thresholds Th1, Th2 and the three attributes #1, #2, #3 create nine regions 502, 504, 506, 508, 510, 512, 514, 516, 518 for which an action is defined.

Any portion of the action table may be an action table as such. Therefore, from a precise action table, a simpler action table may be generated.

For example, in FIG. 5, when considering regions 502-506, which involve the first attribute #1, the second attribute #2 and the first threshold Th1, control circuitry may generate an instruction to perform any of the following actions (notation ERT will be used for the estimated recovery time obtained at step 306 and ATT will be used for the attribute of the segment):

- When ERT≤Th1 and ATT=attribute #1, action is to wait (region 502),
- When ERT≤Th1 and ATT=attribute #2, action is to wait (region 504),
- When ERT>Th1 and ATT=attribute #1, action is to skip (region 506),
- When ERT>Th1 and ATT=attribute #2, action is to wait (region 508).

When the estimated recovery time is low, the interruption manager system decides to wait, regardless of the attribute of the segment. This means that even though the segment is of low interest to the user, as the waiting time is likely to be low, it is appropriate to wait. However, when the estimated recovery time is medium, the interruption manager decides to wait or skip based on the attribute of the segment. A low-interest segment (first attribute #1) will be skipped, while a medium-interest segment (second attribute #2) will not be skipped.

For example, still in FIG. 5, when considering regions 506-512, which involve the first attribute #1, the second attribute #2 and the second threshold Th2, control circuitry may generate an instruction to perform any of the following actions:

- When ERT≤Th2 and ATT=attribute #1, action is to skip (region 506),
- When ERT≤Th2 and ATT=attribute #2, action is to wait (region 508), When ERT>Th2 and ATT=attribute #1, action is to skip (region 510), When ERT>Th2 and ATT=attribute #2, action is to skip (region 512).

When the estimated recovery time is long, the interruption manager system decides to skip, regardless of the attribute of the segment. This means that even though the segment is of medium interest for the user, as the waiting time is likely to be high, it is appropriate to skip.

The two preceding examples may be combined as follows, as illustrated in FIG. 5:

When ERT≤Th1 and ATT=attribute #1, action is to wait (region 502),

When ERT≤Th1 and ATT=attribute #2, action is to wait (region 504),

When Th1<ERT≤Th2 and ATT=attribute #1, action is to skip (region 506),

When Th1<ERT≤Th2 and ATT=attribute #2, action is to wait (region 508),

When ERT>Th2 and ATT=attribute #1, action is to skip (region 510),

When ERT>Th2 and ATT=attribute #2, action is to skip (region 512).

For example, still in FIG. 5, when considering regions 514-518, which involve the first and second threshold T1, T2 and the third attribute #3, control circuitry may perform the following actions:

When ERT>Th2 and ATT=attribute #3, action is to wait (region 514),

When Th1<ERT≤Th2 and ATT=attribute #2, action is to wait (region 516),

When ERT≤Th1 and ATT=attribute #1, action is to wait (region 518).

When the attribute of the segment is of high interest to the user profile, the interruption manager system decides to wait in any case, regardless of the estimated recovery time. This might happen if the segment is key in the plot of the media asset, as the "I am your father" scene of "Star Wars", or, if the user profile has a preference for car chases and the segment includes a car chase.

The first threshold Th1 may be between 0.5 and 5 s and the second threshold Th2 may be 1 and 30 s (while having Th2>Th1). For instance, the first threshold Th1 may be 3 s and the second threshold Th2 may be 10 s.

The table of FIG. 5 includes clearly separated regions because the classification of the estimated recovery time is based on two thresholds and there are only three different and discrete attributes. However, it is possible to observe that the table is clearly divided into two areas by boundary 520: regions 502, 504, 508, 514-516 lead to wait and regions 506, 510, 512 lead to skip. If more thresholds and more attributes are defined, the table may be more precise, but a similar boundary, in the form of a line, will split the table into two areas. In the case of attributes that are almost continuous (for instance as defined as a score between 0 and 100), it is possible to define an action directly for each couple [ERT-score], as illustrated in FIG. 6, that represents an action table 600 in a continuous or semi-continuous form, with a separation line 602, which defines a skip area 604 and a wait area 606. Below the line 602, the action of area 604 is to skip; above the line 602, the action of area 606 is to wait. The separation line 602 may be an affine function in the form or y=a×x+b, where a and b are coefficient. Control circuity may perform any of the following actions:

When ATT≥a×ERT+b, generate an instruction to wait (area 606),

When ATT<a×ERT+b, generate an instruction to skip (area 604),

This is only an example, and any adaptation of those inequations may be used (in particular a normalization of the ERT and ATT).

In FIGS. 5 and 6, the relationship between the action and the couple estimated recovery time-attribute can be simply expressed as: the longer the estimated recovery time, the more interesting the segment has to be to not be skipped.

When the action is to skip the segment, control circuitry may skip to a subsequent segment that is labelled with a higher attribute. For instance, if there are ten segments of 1 s with the second attribute in a row and the first of the ten segments is interrupted, instead of skipping the first to play the second of the ten segments, control circuitry may skip the ten segments and resume play at a next segment that is labelled with the third attribute.

The interruption table, which provides an estimated recovery time based on the type of the interruption, may be rough or refined. This depends on the amount of data available to create the interruption table and the level of precision in the identification of the type of the interruption. There may be as many hardware items listed in the table as there are relevant hardware items available on the market. There may be as many devices listed in the table as there devices involved in the play process of the media asset. In FIG. 4, interruption table 400 is presented as a chart, with an estimated recovery time for a couple hardware-property/devices but the table may contain many more dimensions. The table may also be built differently. In particular, the interruption table may be a relational database. In particular, the interruption table may include the type of user device, a type of media player, a type of format of the media asset, a location of the user device, network properties (media asset provider, carrier provider, etc.).

The interruption table may further contain data about geographical location and service providers as well. Each new category may multiply the need for data (and hence the size) of the interruption table. While interruption table 400 is a two-dimensional table, the interruption table may be n-dimensional, where n>2.

In an embodiment, the interruption table may be dynamically created and updated. For instance, if the identified type of the interruption involves a hardware item or a device that was not already in the interruption table, a new entry may be generated. The interruption table may also thus be created and updated by incrementation. The estimated recovery time that is retrieved may be the closest in the interruption table. However, once an actual recovery time is obtained (if obtained), the new entry may be populated with a value of the estimated recovery time. In an implementation, the entry becomes accessible for process 300 once a certain amount of data is available (to avoid having an estimated recovery time based on one or two values of actual recovery time). For instance, if the user device is connected to a new WiFi router, a new entry for that WiFi may be created as described above. The more data the user or the users (as data can be shared amongst users, for instance, users sharing a streaming service or a network provider) are able to gather, while playing media assets, the more precise and accurate the estimated recovery time may be.

Existing entries may also be updated. In an implementation described above, the elapsed time since the interruption is monitored, at step 324. When the action is to wait, the elapsed time may overshoot the estimated recovery time. In response, control circuitry may update or generate an instruction to update the interruption table, even though no actual recovery time is obtained. Control circuitry may detect a time of recovery at which play of the video segment is resumed; using the elapsed time between the interruption and time of recovery, control circuitry may update the interruption table.

In an implementation described above, after a segment is skipped, control circuitry displays an option to come back to the play position of the interruption. If control circuitry receives such input, that is, if the option to come back to the play position of the interruption is selected, then it means that skipping the segment was not the appropriate action to perform. Alternatively, if, after a segment is skipped, control circuitry receives a navigation input to rewind the media asset, it means that skipping the segment was not the appropriate action to perform. In order to improve the interruption manager system, control circuitry may, upon receiving an input from the user device after the segment is skipped (e.g., an input to rewind or to come back to the interrupted play position), update the action table or update the user's profile used during the process of labelling the segment with attribute. For instance, an action to skip may become an action to wait in the action table.

Figure 7:
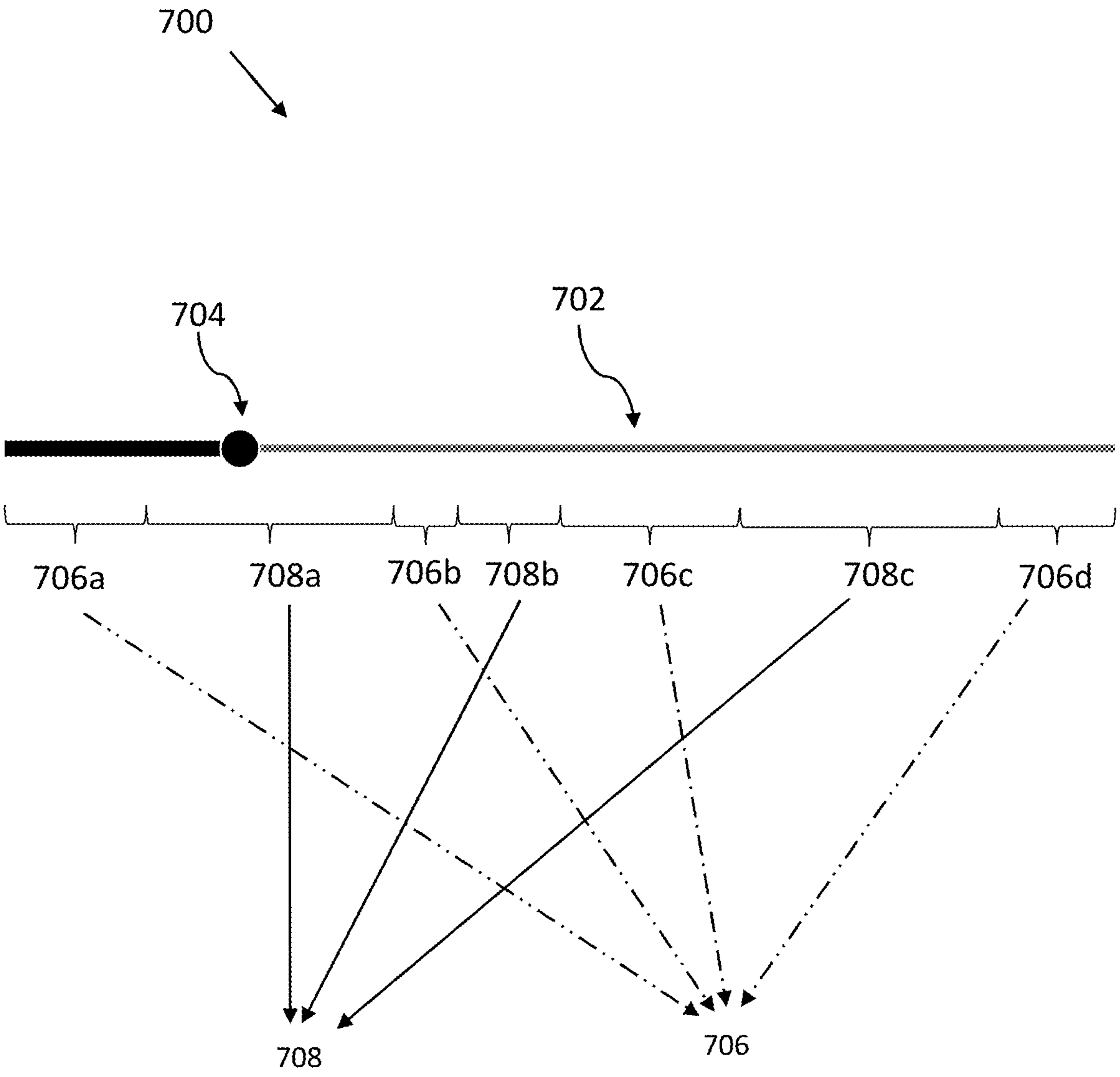
FIG. 7 is an illustrative diagram of a distribution of attributes in a media asset, in accordance with some embodiments of the disclosure.

FIG. 7 illustrates a media asset 700 by means of a seek bar 702 and a play position 704: the media asset 700 is split into several segments, which are labelled with the first attribute 706 (low interest) or the second attribute 708 (high interest). More attributes could be used but to simplify the drawing, only two are illustrated. Segments 706*a*, 706*b*, 706*c*, 706*d* are labelled with the first attribute 706 and segments 708*a*, 708*b*, 708*c* are labelled with the second attribute 708. In practice, there may be many more segments than illustrated, for technical reasons (see above, where segments are also called chunks). However, labelling the segment does not need to be carried out at the segment level, but at a higher level, such as a scene (which comprises a plurality of segments). For instance, segment 706*a* may be the introduction of the media asset and segment 706*d* may be the credits at the end of the media asset: those segments are usually of low interest and may be labelled with the first attribute. All segments relating to the introduction or the credits of a media asset may be labelled as low interest (first attribute in the present description).

In an embodiment, the attribute of the segment is determined based on metadata of the media asset. In one implementation, the server device 222 (e.g., a media asset provider) may provide a media asset containing metadata for each segment of the media asset (or at least some segments). The metadata may be provided (e.g., added, incorporated) by a media asset generator (producer, movie studio, etc.) or by the server device 222 analyzing the media asset. In an implementation, the attribution of metadata is based on the length of a scene, the length of shots in the content, the presence of dialogue, the presence of a soundtrack, identification of a category of a scene (action, romance, dialogue, etc.), etc. This attribution may be performed on the fly, that is to say while the media asset is being output, or pre-performed, as described previously. A default attribution, in case no metadata can be specifically attributed to a scene, may be to define a segment with a first, second or third attribute. For instance, all the segments of the scene "I am your father" in "Star Wars" will be labelled with the attribute of the highest importance (third attribute in the present description).

The metadata of the media asset may be cross-referenced with the user's profile to determine the attribute of the segment. For example, a user profile indicating a preference for action movies will lead to a segment of a media asset containing action scenes being labelled with the second or third attribute. Conversely, a user profile indicating no appeal for romance movies will lead to segments of a media asset containing romance scenes being labelled with the first attribute.

Figure 8:
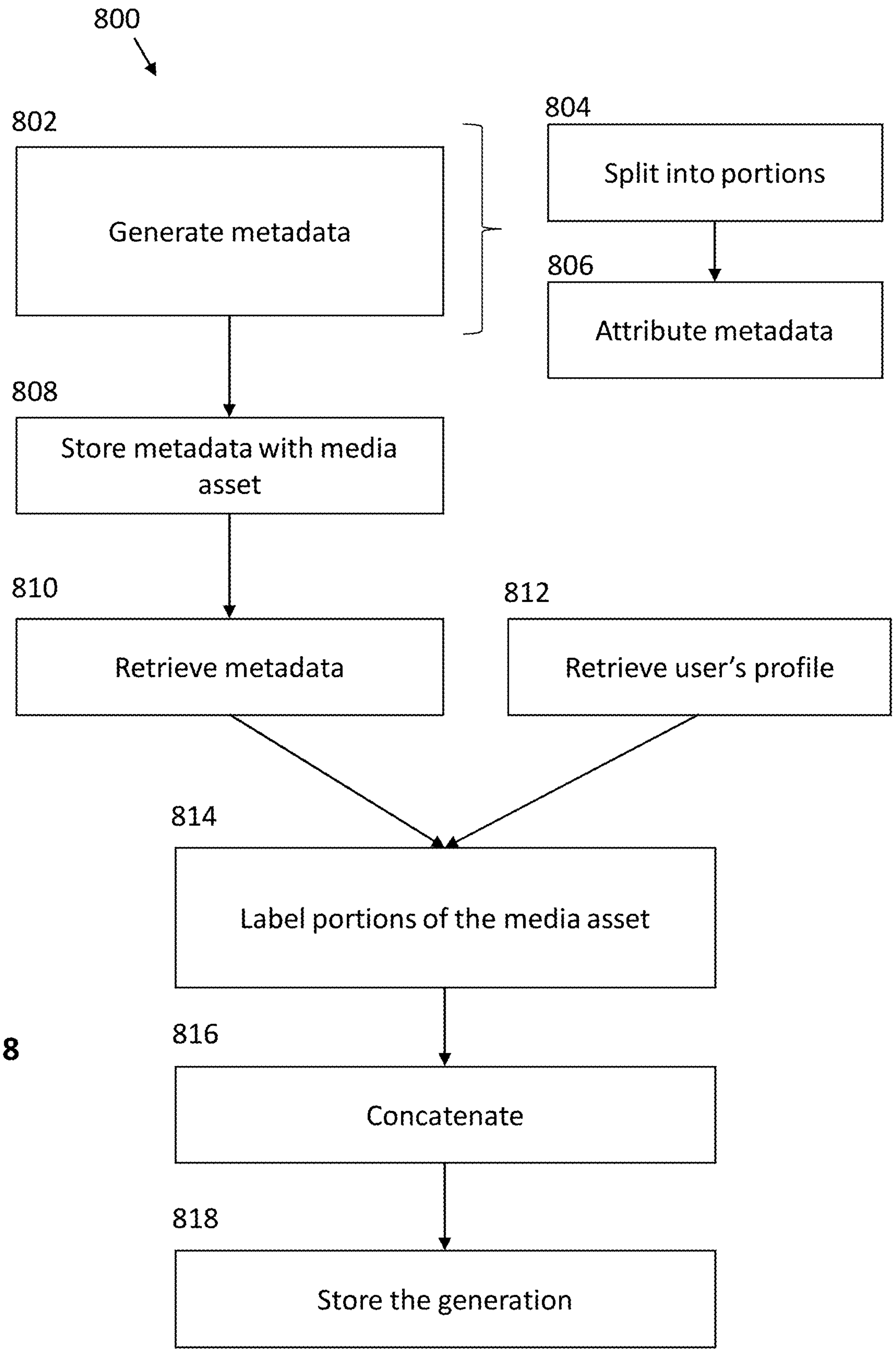
FIG. 8 is an illustrative flowchart of a process to label a segment with an attribute.

FIG. 8 is a flowchart 800 illustrating how to determine how to label the segments of a media asset. At step 802, control circuitry generates metadata for the media asset, in particular for some scenes or sequences of the media asset (or all of them). Step 802 of generating metadata may be broken down as step 804 of splitting the media asset into portions and step 806 of attributing to each portion at least one metadata (e.g., action, love, car chase, dialogue, landscape, bright, gloomy, etc.). A portion may be a scene, for instance. The metadata are those described above. At step 808, control circuitry stores the metadata with the media asset. These steps 802, 804, 806, 808 can be performed by the control circuitry 224 of the server device 222 or the control circuitry 204 of the user device 202. These steps can advantageously be performed in advance, before receiving an input that a media asset is to be output. At step 810, control circuitry retrieves stored metadata of the media asset. At step 812, which may be carried out in parallel with steps 802 to 810, control circuitry retrieves the user's profile. The user's profile may be stored in storage 230 of the server device 222 or in storage 210 of the user device 202. At step 814, using the retrieved metadata and the user profile, control circuitry combines for each portion of the media asset the attributed metadata and information from the user's profile to label each attribute with an attribute (first, second or third attribute for instance). The portions will form the segments described in relation to FIG. 7. At step 816, the whole media asset is labelled, typically by concatenating the labelled portions of the media asset. Finally, at step 818, the concatenation is stored, so that control circuitry may readily access the labelled portions during playback, for instance for the step 324 of determining an attribute of the segment. Typically, labelling the segment may consist of an array comprising time intervals (the portions) associated with attributes. Steps 814 to 816 may be performed by the control circuitry 224 of the server device 222 or the control circuitry 204 of the user device 202. Steps 814 to 816 may be performed in response to retrieving an input that a media asset is to be output or is being output. In particular, in one implementation, steps 802-810 may be performed by the server device 222 while steps 812-816 may be performed by the user device 202. In another implementation, steps 802 to 816 are all performed by the server device 222. Determining the attribute of a segment may therefore include retrieving the stored concatenation. If the segments used are chunks, then each portion may be split into a plurality of segments. Then determining an attribute of a segment includes determining the portion to which the segment belongs, the attribute of the segment being thus the attribute of the portion.

Preferably control circuitry identifies only undesired interruption of play of the media assets. In other words, any interruption that was not provoked by a user input to pause is considered. However, in an embodiment, even the pause instruction may be detected. In that case, the interruption table may give, for a pause instruction, an estimated recovery time of zero seconds. This way, the action will always be to wait and not to skip the segment.

Process 300 may be carried out remotely on a server device, or locally on the user device. Process 300 may also be carried out in part on a server device and in part on the user device, depending on the circumstances.

In an implementation, the media asset is stored in storage 210 of the user device 202 and therefore, any interruption that may occur is internal to the user device 202. In that case, process 300 may be carried completely internally, and the tables are stored in storage 210. However, the tables may contain less information, and therefore, the estimated recovery time may be less likely to be accurate and the action may be less appropriate for the user. Alternatively, the user may request data from the server device. For instance, the interruption table and the action table may be stored in storage 230 of the server device. In that case, steps 302 and 310 may be performed by the user device and steps 304, 306, 312.

In an implementation, the media asset is streamed from a remote server, for instance the server device 222. In that case process 300 may be carried out entirely by the server device. Step 302 of detecting interruption of play may be performed by receiving information from the user device informing the server of the interruption. The instruction generated at step 310 by the server device is then sent to the user device.

The methods and/or any instructions for operating any of the embodiments discussed herein may be encoded on computer-readable media. Computer-readable media includes any media capable of storing data. The computer-readable media may be transitory, including, but not limited to, propagating electrical or electromagnetic signals, or may be non-transitory, including, but not limited to, volatile and non-volatile computer memory or storage devices such as a hard disk, floppy disk, USB drive, DVD, CD, media cards, register memory, processor caches, random access memory (RAM), etc.

The above-described embodiments of the present disclosure are presented for purposes of illustration and not of limitation, and the present disclosure is limited only by the claims that follow. Furthermore, it should be noted that the features and limitations described in any one embodiment may be applied to any other embodiment herein, and flowcharts or examples relating to one embodiment may be combined with any other embodiment in a suitable manner, done in different orders, or done in parallel. In addition, the systems and methods described herein may be performed in real time. It should also be noted, the systems and/or methods described above may be applied to, or used in accordance with, other systems and/or methods.

What is claimed is:

1. A method comprising:

detecting an interruption during playing of a media asset on a user device, wherein the media asset comprises at least a first segment and a second segment;

accessing a user profile associated with the user device, wherein the user profile indicates at least a first media characteristic corresponding to a first importance score having a high value and a second media characteristic corresponding to a second importance score having a non-high value;

determining, based at least in part on the user profile, that the first segment comprises the first media characteristic and that the second segment comprises the second media characteristic;

based on determining that the interruption during playing of the media asset occurred during presentation of the first segment, selecting, by control circuitry, a first selected action to perform, wherein the first selected action comprises playing the first segment from a position where the interruption occurred;

based on determining that the interruption during playing of the media asset occurred during presentation of the second segment, selecting, by the control circuitry, a second selected action to perform, wherein the second selected action comprises skipping the second segment and resuming playing the media asset from a position after the second segment; and causing the control circuitry to perform at least the first selected action or the second selected action.

2. The method of claim 1, further comprising:

determining the first importance score and the second importance score based at least in part on comparing metadata associated with the media asset with data accessed in the user profile.

3. The method of claim 1, wherein the user profile indicates a first user preference for a content genre associated with the first media characteristic, and a second user preference for a content genre associated with the second media characteristic.

4. The method of claim 1, wherein one or more of the first importance score and the second importance score is determined based at least in part on one or more of: a length of a scene of a segment, a length of a shot in the segment, presence of dialogue in the segment, presence of a soundtrack in the segment, or presence of an actor in the segment.

5. The method of claim 1, wherein one or more of the first importance score and the second importance score is determined based at least in part on an identification of a category of the second segment.

6. The method of claim 1, further comprising:

determining an estimated recovery time for the detected interruption;

based at least in part on the estimated recovery time, selecting by the control circuitry, the second selected action to perform.

7. The method of claim 1, further comprising:

generating for display at the user device a notification of skipping of the second segment.

8. The method of claim 1, further comprising:

generating for display a request to skip; and receiving, based at least in part on the request, a user interface input to the request to skip, wherein the second segment is skipped in response to the receiving the user interface input to skip.

9. The method of claim 1, further comprising:

receiving a user interface input from a computing device after the second segment was skipped; and updating the user profile used in generating the second importance score of the second segment.

10. A system comprising:

input/output circuitry configured to:

detect an interruption during playing of a media asset on a user device, wherein the media asset comprises at least a first segment and a second segment; and control circuitry configured to:

access a user profile associated with the user device, wherein the user profile indicates at least a first media characteristic corresponding to a first importance score having a high value and a second media characteristic corresponding to a second importance score having a non-high value;

determine, based at least in part on the user profile, that the first segment comprises the first media characteristic and that the second segment comprises the second media characteristic;

based on determining that the interruption during playing of the media asset occurred during presentation of the first segment, select a first selected action to perform, wherein the first selected action comprises playing the first segment from a position where the interruption occurred;

based on determining that the interruption during playing of the media asset occurred during presentation of the second segment, select a second selected action to perform, wherein the second selected action comprises skipping the second segment and resuming playing the media asset from a position after the second segment; and cause performance of at least the first selected action or the second selected action.

11. The system of claim 10, the control circuitry further configured to:

determine the first importance score and the second importance score based at least in part on comparing metadata associated with the media asset with data accessed in the user profile.

12. The system of claim 10, wherein the user profile indicates a first user preference for a content genre associated with the first media characteristic, and a second user preference for a content genre associated with the second media characteristic.

13. The system of claim 10, wherein one or more of the first importance score and the second importance score is determined based at least in part on one or more of: a length of a scene of a segment, a length of a shot in the segment, presence of dialogue in the segment, presence of a soundtrack in the segment, or presence of an actor in the segment.

14. The system of claim 10, wherein one or more of the first importance score and the second importance score is determined based at least in part on an identification of a category of the second segment.

15. The system of claim 10, wherein the system is configured:

determining an estimated recovery time for the detected interruption;

based at least in part on the estimated recovery time, selecting by the control circuitry, the second selected action to perform.

16. The system of claim 10, wherein the system is configured:

generating for display at the user device a notification of skipping of the second segment.

17. The system of claim 10, wherein the system is configured:

generating for display a request to skip; and receiving, based at least in part on the request, a user interface input to the request to skip, wherein the second segment is skipped in response to the receiving the user interface input to skip.

18. The system of claim 10, wherein the system is configured:

receiving a user interface input from a computing device after the second segment was skipped; and updating the user profile used in generating the second importance score of the second segment.

* * * * *